(12) United States Patent
Zhang et al.

(10) Patent No.: US 11,683,250 B2
(45) Date of Patent: Jun. 20, 2023

(54) MANAGING PROXY THROUGHPUT BETWEEN PAIRED TRANSPORT LAYER CONNECTIONS

(71) Applicant: Palo Alto Networks, Inc., Santa Clara, CA (US)

(72) Inventors: Yu Zhang, Pleasanton, CA (US); Harshavardhan Parandekar, San Jose, CA (US); Nazanin Magharei, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/451,944

(22) Filed: Oct. 22, 2021

(65) Prior Publication Data

US 2023/0131398 A1 Apr. 27, 2023

(51) Int. Cl.
*H04L 43/0864* (2022.01)
*H04L 43/0882* (2022.01)
*H04L 43/16* (2022.01)
*H04L 69/326* (2022.01)
*H04L 67/561* (2022.01)

(52) U.S. Cl.
CPC ...... *H04L 43/0864* (2013.01); *H04L 43/0882* (2013.01); *H04L 43/16* (2013.01); *H04L 67/561* (2022.05); *H04L 69/326* (2013.01)

(58) Field of Classification Search
None
See application file for complete search history.

(56) References Cited

U.S. PATENT DOCUMENTS

| | | | | |
|---|---|---|---|---|
| 2005/0220097 | A1* | 10/2005 | Swami | H04L 47/50 370/389 |
| 2012/0278459 | A1* | 11/2012 | VerSteeg | H04L 69/163 709/223 |
| 2013/0205038 | A1* | 8/2013 | DeCusatis | H04L 47/10 709/235 |
| 2014/0071993 | A1* | 3/2014 | Sazawa | H04L 47/54 370/412 |

(Continued)

OTHER PUBLICATIONS

Baccelli, et al., "Proxy Caching in Split TCP: Dynamics, Stability and Tail Asymptotics", IEEE INFOCOM 2008—The 27th Conference on Computer Communications, doi: 10.1109/INFOCOM.2008.35, May 2, 2008, 9 pages.

(Continued)

*Primary Examiner* — Joshua Joo
(74) *Attorney, Agent, or Firm* — Gilliam IP PLLC

(57) ABSTRACT

A proxy server can be configured to manage flow between terminated transport layer connections despite incongruous network conditions. The proxy server is programmed to dynamically adjust window size of one transport layer connection in the pair of proxy terminated connections to accommodate the other connection. After detecting a network condition related to one of the connections, the proxy server determines a drain rate of the transmit buffer of the transport layer connection corresponding to the impacting network condition. The proxy server then adjusts the transport layer window size for the other connection of the connection pair based on the determined drain rate.

19 Claims, 3 Drawing Sheets

(56) References Cited

U.S. PATENT DOCUMENTS

| | | | |
|---|---|---|---|
| 2014/0304320 A1* | 10/2014 | Taneja | H04L 69/326 |
| | | | 709/203 |
| 2016/0127251 A1* | 5/2016 | Ovsiannikov | H04L 47/2441 |
| | | | 370/415 |
| 2017/0310601 A1* | 10/2017 | Yu | H04L 69/161 |
| 2018/0034742 A1* | 2/2018 | Flores | H04L 47/27 |
| 2020/0084154 A1* | 3/2020 | Lawrence | H04L 67/02 |
| 2020/0128112 A1* | 4/2020 | Li | H04L 69/16 |
| 2020/0366608 A1* | 11/2020 | Pan | H04L 43/0852 |
| 2020/0389406 A1* | 12/2020 | Ramaiah | H04L 47/2433 |
| 2021/0266261 A1* | 8/2021 | Hosokawa | H04L 67/562 |

OTHER PUBLICATIONS

Liu, et al., "On Improving TCP Performance over Mobile Data Networks", IEEE Transactions on Mobile Computing, vol. 15, No. 10, doi: 10.1109/TMC.2015.2500227, Oct. 1, 2016, pp. 2522-2536.
Maki, et al., "Performance Analysis and Improvement of TCP Proxy Mechanism in TCP Overlay Networks", IEEE International Conference on Communications, 2005. ICC 2005, vol. 1, doi: 10.1109/ICC.2005.1494344, Aug. 15, 2005, 7 pages.

\* cited by examiner

MANAGING PROXY THROUGHPUT BETWEEN PAIRED TRANSPORT LAYER CONNECTIONS

BACKGROUND

The disclosure generally relates to an electronic communication technique and transmission of digital information (CPC H04L).

The connection-oriented communication protocol Transport Control Protocol (TCP) provides a control flow mechanism. During a handshake between TCP endpoints, handshake messages advertise window sizes for the read buffers of the endpoints and establish maximum segment sizes (MSSs). When communicating an acknowledgement segment (ACK), the ACK advertises the window size which indicates the read buffer that is available after removal of the acknowledged segment from the read buffer. A TCP instance advertises window size as part of the control flow mechanism for a receiver to govern the amount of data transmitted to the receiver and prevent a sender endpoint from overwhelming the receiver endpoint. A sender endpoint or sender will send data according to a sliding window protocol. The sender will send data in segments up to the most recently advertised window size. According to the ACKs from the receiver, the sender will proceed with sending additional segments to fill the available read buffer determined from the ACKs. If the receiver endpoint receives a segment while the read buffer is full, then the receiver will advertise a window size of 0 (zero window condition).

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to a transport layer security (TLS) proxy and a firewall in illustrative examples. However, embodiments are not limited to a particular proxy implementation. Embodiments can be applied to a variety of environments that involve a proxy between transport layer connections that may experience incongruous network conditions. In other instances, well-known instruction instances, protocols, structures and techniques have not been shown in detail in order not to obfuscate the description.

Overview

A network security device can run a firewall as a TLS proxy server to examine encrypted data traffic traversing the network security device. To manage incongruous network conditions that can impact proxy throughput, a proxy throughput manager is disclosed herein that dynamically adjusts window size of the transport layer connection with a better network condition (e.g., lower bandwidth delay product (BDP)) to accommodate the other connection. After detecting a network condition for a connection of a proxied connection pair that impacts proxy throughput (e.g., a zero window condition), the proxy server determines a drain rate of the write buffer of the transport layer connection corresponding to the impacting network condition. The proxy server then adjusts the transport layer window size for the other connection of the connection pair based on the determined drain rate.

Example Illustrations

Figure 1:
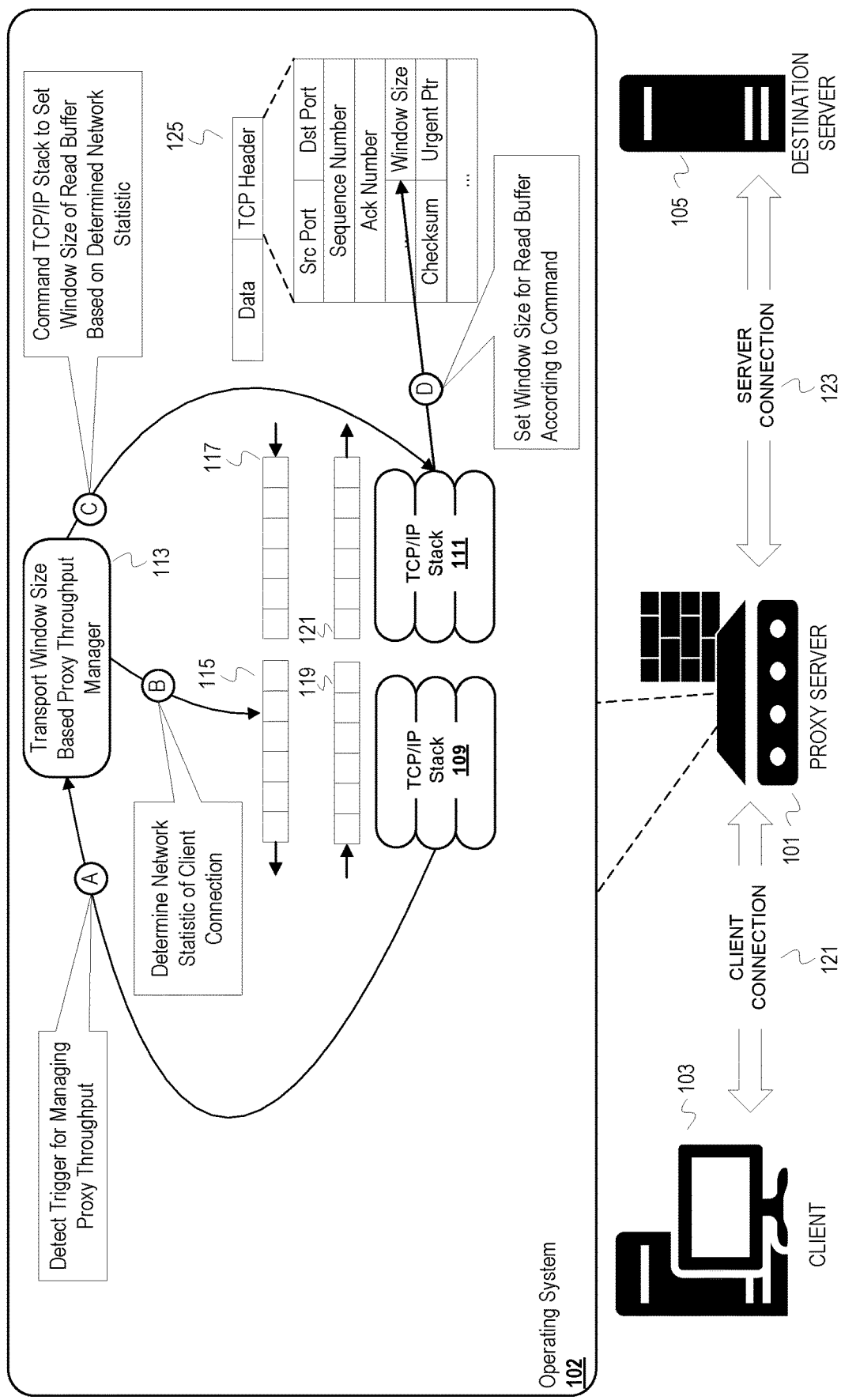
FIG. 1 depicts a diagram of a proxy throughput manager leveraging transport layer flow control to manage throughput of paired transport layer connections with heterogeneous network conditions.

FIG. 1 depicts a diagram of a proxy throughput manager leveraging transport layer flow control to manage throughput of paired transport layer connections with heterogeneous network conditions. FIG. 1 includes a client 103, a proxy server 101, and a destination server 105. This illustration presumes that a firewall implements the proxy server 101. The proxy server 101 terminates transport layer connections with the client 103 and the destination server 105. The connection between the proxy server 101 and the client 103 is labelled as a client connection 121 and the connection between the proxy server 101 and the destination server 105 is labelled as a server connection 123. These labels are used merely for descriptive efficiency. The proxy server 101 hosts an operating system 102 that includes a transport window size based proxy throughput manager (hereinafter "proxy throughput manager") 113 and TCP/IP stack instances 109, 111. The TCP/IP stack instance 109 terminates the client connection 121 and the TCP/IP stack instance terminates the server connection 123. The operating system 102 has allocated a read buffer 119 and a write buffer 115 to the TCP/IP stack instance 109. The operating system 102 has allocated a read buffer 117 and a write buffer 121 to the TCP/IP stack instance 111.

FIG. 1 is annotated with a series of letters A-D which represent stages of operations, each of which can be one or more operations. Although these stages are ordered for this example, the stages illustrate one example to aid in understanding this disclosure and should not be used to limit the claims. Subject matter falling within the scope of the claims can vary with respect to the order and some of the operations.

At stage A, the proxy throughput manager 113 detects a trigger for managing proxy throughput. "Proxy throughput" refers to the rate of data being read by the proxy server 101 from a read buffer of one transport layer connection and then written to the write buffer of the other transport layer connection forming the pair of transport layer connections terminating at the proxy server 101. Managing the proxy throughput refers to maintaining a stable flow of data/segments between the terminated transport layer connections. Triggers for managing proxy throughput include events or notifications that indicate a condition that can impact the stable flow between proxy terminated connections. A trigger can relate to condition of the network supporting one of the connections forming a proxy terminated connection pair. In FIG. 1, the trigger arises from a network condition of the client connection 121.

At stage B, the proxy throughput manager 113 determines a network statistic of the client connection 121. For example, the proxy throughput manager 113 determines the bandwidth delay product for the client connection 121. To determine the BDP, the proxy throughput manager 113 can access information from the operating system 102 about data link size or transmission rate capacity of the data link supporting client connection 121 and obtain round trip delay (RTD) from the TCP/IP stack instance 109.

At stage C, the proxy throughput manager 113 commands the TCP/IP stack instance 111 to set window size of the read buffer based on the determined network statistic. For instance, the proxy throughput manager 113 runs a TCP configuration command. The proxy throughput manager 113 determines a window size for the read buffer 117 based on the network statistic determined for the client connection 121. Assuming the network statistic is a BDP value, then the proxy throughput manager 113 determines a window size for the read buffer 117 that can accommodate the BDP value corresponding to the write buffer 115. This can prevent a network condition that is impeding draining of the write buffer 115 from propagating to the server connection 123.

At stage D, the TCP/IP stack instance 111 advertises the window size according to the command from the proxy throughput manager 113. The TCP/IP stack instance 111 sets the window size field in a TCP header of an ACK segment 125.

The example illustration of FIG. 1 presumes the client connection 121 is the connection impeding proxy throughput. While a common case will be that the underlying communication network for a client connection (e.g., last mile) has less capacity than the underlying communication network for a server connection, that is not necessarily the case. Varying conditions, environments, infrastructure, can arise to create heterogeneous network conditions on either side of a proxy. And the network conditions may be transient.

Figure 2:
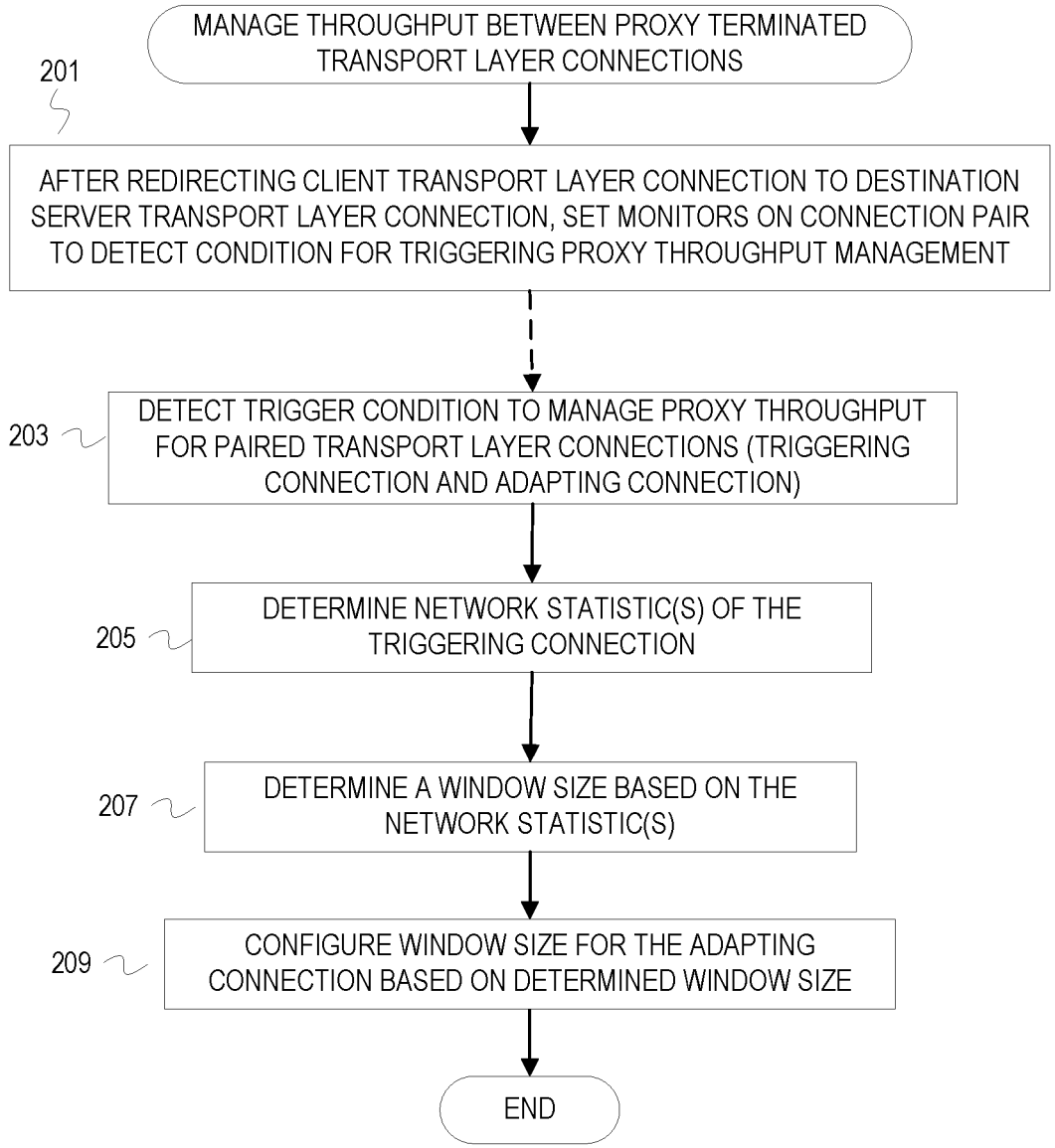
FIG. 2 is a flowchart of example operations for managing proxy throughput between a proxy terminated pair of transport layer connections.

FIG. 2 is a flowchart of example operations for managing proxy throughput between a proxy terminated pair of transport layer connections. The example operations are described with reference to a proxy throughput manager for consistency with the earlier figure. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary. The proxy throughput manager can be program code that is integrated into proxy program code or invoked for a proxy.

At block 201, the proxy throughput manager sets monitors on a pair of transport layer connections terminated by a proxy associated with the proxy throughput manager. The proxy throughput manager sets the monitors to detect a condition for trigger throughput management ("trigger condition"). After a proxy redirects a client transport connection to a destination server transport layer connection, the proxy indicates the pairing of connections to the proxy throughput manager. If the proxy throughput manager is a separate process from the proxy, then the proxy notifies the proxy throughput manager of the pairing of transport layer connections. If proxy throughput manager is incorporated into the proxy, then the proxy can execute the corresponding program code to launch the proxy throughput manager process.

The proxy throughput manager can set monitors with different techniques. Setting monitors can be subscribing to another process to receive notifications of events, instantiating listener processes that have visibility of ACK segments, monitoring data occupying buffers, etc. The proxy throughput manager can subscribe to the transport layer communication processes (e.g., TCP process) for notifications of throughput impacting events.

At block 203, the proxy throughput manager detects a trigger condition to manage proxy throughput for the paired transport layer connections. To distinguish the connections, the transport layer connection corresponding to the trigger condition is referred to as the triggering connection and the other connection is referred to as the adapting connection. The trigger condition indicates that the network condition of the triggering connection is hampering or impeding proxy throughput. In other words, the network condition of the triggering connection cannot consume the data being written from the read buffer of the adapting connection.

At block 205, the proxy throughput manager determines a network statistic(s) of the triggering connection. The network statistic(s) relates to the network condition of the triggering connection. Example network statistics include packet loss, RTT, and latency. The example network statistic can be BDP computed from link size and a transport layer statistic.

At block 207, the proxy throughput manager determines a window size based on the network statistic(s) of the triggering connection. The proxy throughput manager determines a window size for the adapting connection that can avoid overwhelming the triggering connection. Determining the window size may be according to a rule that specifies a margin with respect to a boundary that is the network statistic or based on the network statistic. For instance, the BDP for the triggering connection may be the network statistic. The rule can specify that the window size for the adapting connection be set above the BDP within a margin or at a predefined distance from the BDP. As an example, the window size can be set to be product of the BDP and a predetermined factor (e.g., 1.2) or a sum of the BDP and a predetermined distance (e.g., 200 kilobytes). Resizing the transport layer window to be between the current window size and the BDP accounts for the various reasons that lead to the triggering condition. One reason may be that the initial window size is insufficient for the network capacity (i.e., the initial window size is too small). Another reason is mismatched latency—the triggering connection has a longer latency than the adapting latency. As a result, the ramp up of throughput for the triggering connection is slower than for the adapting connection. Another reason is temporary network congestion or packet loss on the triggering connection. Sizing the window to be greater than BDP allows the proxy to buffer data sufficient to mitigate the transient network condition. This also avoid consuming memory of the proxy. The proxy throughput manager may also account for historical behavior. The proxy throughput manager may compute an average BDP across a defined time window while the connection pairing has been active and use the average as the network statistic used to set the window size. Assuming a MSS of 512 bytes for the adapting connection and a BDP of 125 kilobytes (kB) for the triggering connection and a window sizing factor of 1.2, then the proxy throughput manager could determine the window size for the adapting connection to be 293 segments or 150,016 bytes.

At block 209, the proxy throughput manager configures the window size of the adapting connection based on the determined window size. The proxy throughput manager executes a configuration command for the transport layer process to set the maximum window size to the determined window size.

Variations

The above examples presume throttling of the window size of a higher capacity connection in a transport layer connection pair. When a zero window condition is detected for the triggering connection, then the window size of the adapting connection is adjusted to control flow between the paired connections and maintain stable throughput for the proxy. The proxy throughput manager can periodically query network tools or the network stack instance for improvements as well as degradations in network connections. Embodiments can set a timer after reducing window size and assess the network condition of the triggering connection after expiration of the timer to determine whether the window size of the adapting connection can be increased (e.g., increasing to a midpoint between the current window size and default window size). Embodiments can monitor the write buffers of a pair of transport layer connections and trigger a window size reconfiguration if a drain rate of either write buffer decreases below a threshold of variation or increases and sustains the increase over a defined time period.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 3:
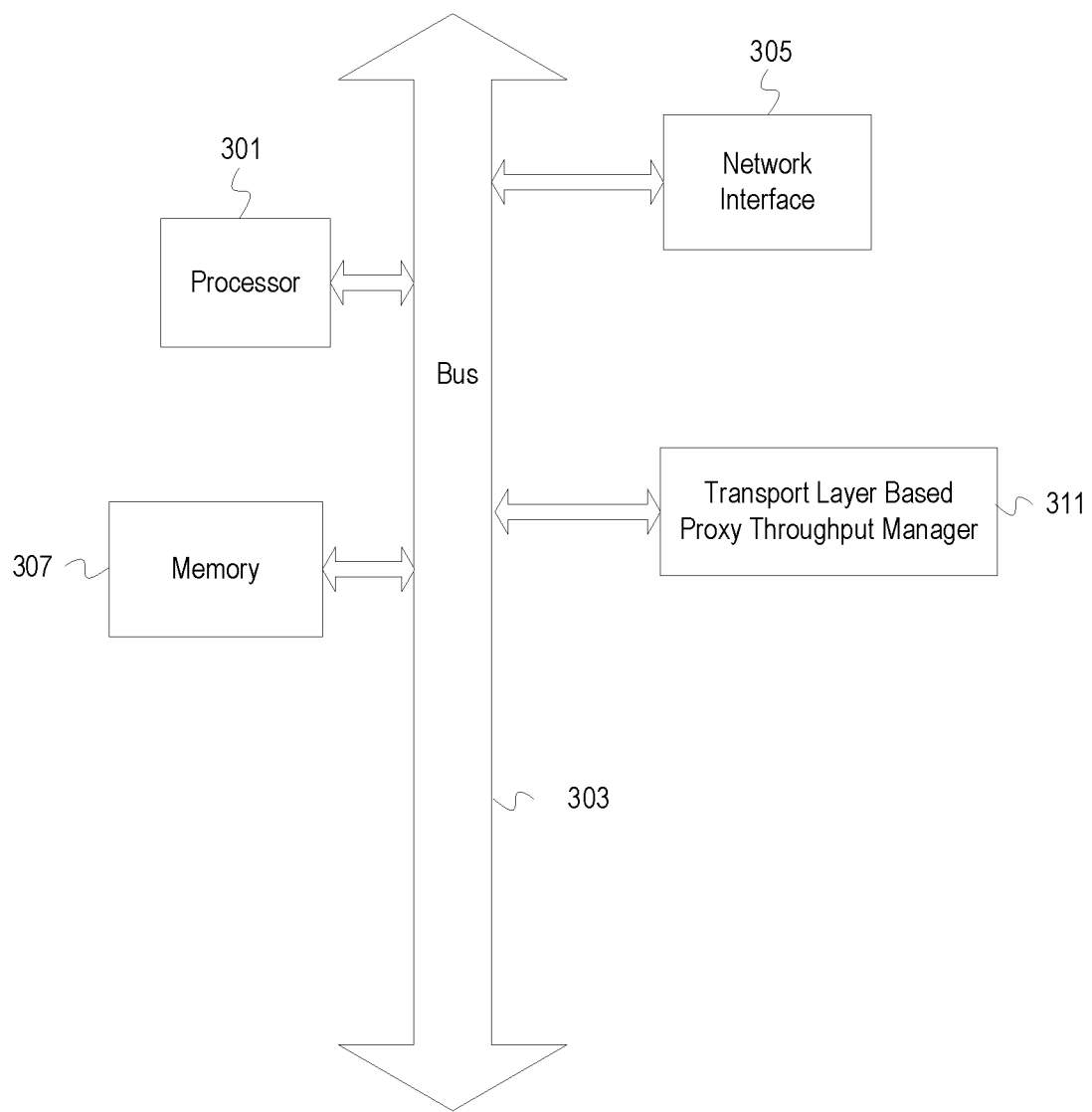
FIG. 3 depicts an example computer system with a transport layer based proxy throughput manager.

FIG. 3 depicts an example computer system with a transport layer based proxy throughput manager. The computer system includes a processor 301 (possibly including multiple processors, multiple cores, multiple nodes, and/or implementing multi-threading, etc.). The computer system includes memory 307. The memory 307 may be system memory or any one or more of the above already described possible realizations of machine-readable media. The computer system also includes a bus 303 and a network interface 305. The system also includes a transport layer based proxy throughput manager 311. The transport layer based proxy throughput manager 311 manages or regulates window size of paired transport layer connections terminated by a proxy to facilitate stable flow between the paired connections. This eliminates or reduces the likelihood of one connection overwhelming the other connection and facilitates optimal use of the lesser capacity connection. Any one of the previously described functionalities may be partially (or entirely) implemented in hardware and/or on the processor 301. For example, the functionality may be implemented with an application specific integrated circuit, in logic implemented in the processor 301, in a co-processor on a peripheral device or card, etc. Further, realizations may include fewer or additional components not illustrated in FIG. 3 (e.g., video cards, audio cards, additional network interfaces, peripheral devices, etc.). The processor 301 and the network interface 305 are coupled to the bus 303. Although illustrated as being coupled to the bus 303, the memory 307 may be coupled to the processor 301.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   detecting a condition corresponding to a first of a proxied pair of transport layer connections, wherein the condition impacts throughput between the proxied pair of transport layer connections;
   based on detecting the condition, determining a set of one or more network statistics for the first of the proxied pair of transport layer connections, wherein the set of one or more network statistics comprises a bandwidth delay product of the first of the proxied pair of transport layer connections;
   determining a transport layer window size greater than the bandwidth delay product; and
   configuring a window size of a second of the proxied pair of transport layer connections to the determined transport layer window size,
   wherein configuring the window size comprises decreasing transport layer window size of one of the proxied pair of transport layer connections based on detection of decreased drain rate of a write buffer of the other one of the proxied pair of transport layer connections, wherein the decreased drain rate is the condition that impacts throughput of the proxied pair of transport layer connections.

2. The method of claim 1, wherein determining the set of one or more network statistics for the first of the proxied pair of transport layer connections is based on a set of one or more statistics corresponding to a write buffer of the first of the proxied pair of transport layer connections.

3. The method of claim 1, wherein the set of one or more network statistics also comprises at least one of packet loss of the first of the proxied pair of transport layer connections, round trip delay of the first of the proxied pair of transport layer connections, and a data transmit rate capacity of a data link supporting the first of the proxied pair of transport layer connections.

4. The method of claim 1, wherein detecting the condition comprises detecting a zero window condition for the first of the proxied pair of transport layer connections.

5. The method of claim 1, wherein determining the transport layer window size comprises determining a value greater than a bandwidth delay product within a predefined margin or increasing the bandwidth delay product by a defined factor.

6. The method of claim 1 further comprising monitoring the proxied pair of transport layer connections for the condition that impacts throughput of the proxied pair of transport layer connections.

7. The method of claim 6, wherein monitoring the proxied pair of transport layer connections comprises monitoring write buffers of the proxied pair of transport layer connections.

8. The method of claim 1, wherein the proxied pair of transport layer connections is a proxied pair of transport control protocol connections.

9. A non-transitory, machine-readable medium having program code for managing proxy terminated transport layer connections, the program code comprising instructions to:
   monitor a proxied pair of transmission control protocol (TCP) connections for a condition that impacts throughput between the proxied pair of TCP connections;
   based on detecting the condition, determine a set of one or more network statistics for a first TCP connection, wherein the set of one or more network statistics comprises a bandwidth delay product of the first TCP connection;
   determine a transport layer window size that is greater than the bandwidth delay product; and
   configure a window size of a second of the proxied pair of TCP connections to the determined transport layer window size,
   wherein the program code comprises instructions to decrease transport layer window size of one of the proxied pair of TCP connections based on detection of decreased drain rate of a write buffer of the other one of the proxied pair of TCP connections, wherein the decreased drain rate is the condition that impacts throughput of the proxied pair of TCP connections.

10. The non-transitory, machine-readable medium of claim 9, wherein the instructions to determine the set of one or more network statistics for the first TCP connection comprise the instructions to determine the set of one or more statistics based, at least in part, on one or more statistics of a write buffer of the first TCP connection.

11. The non-transitory, machine-readable medium of claim 9, wherein the set of one or more network statistics further comprises at least one of packet loss of the first TCP connection, round trip delay of the first TCP connection, and a data transmit rate capacity of a data link supporting the first TCP connection.

12. The non-transitory, machine-readable medium of claim 9, wherein the instructions to monitor for a condition comprise instructions to monitor for a zero window condition.

13. The non-transitory, machine-readable medium of claim 9, wherein the instructions to determine the transport layer window size comprise instructions to determine a value greater than a bandwidth delay product within a predefined margin or to increase the bandwidth delay product by a defined factor.

14. The non-transitory, machine-readable medium of claim 9, wherein the instructions to monitor the proxied pair of TCP connections comprise instructions to monitor write buffers of the proxied pair of TCP connections.

15. An apparatus comprising:
   a processor; and
   a machine-readable medium having instructions stored thereon that are executable by the processor to cause the apparatus to,
   monitor a proxied pair of transport layer connections for a condition that impacts throughput between the proxied pair of transport layer connections;
   based on detection of the condition for a first of the proxied pair of transport layer connections, determine a set of one or more network statistics for the first of the proxied pair of transport layer connections, wherein the set of one or more network statistics comprises a bandwidth delay product of the first of the proxied pair of transport layer connections;
   determine a transport layer window size greater than the bandwidth delay product; and
   configure a window size of a second of the proxied pair of transport layer connections to the determined transport layer window size,
   wherein the instructions further comprise instructions to decrease transport layer window size of one of the proxied pair of transport layer connections based on detection of decreased drain rate of a write buffer of the other one of the proxied pair of transport layer connections, wherein the decreased drain rate is the condition that impacts throughput of the proxied pair of transport layer connections.

16. The apparatus of claim 15, wherein the instructions to determine the set of one or more network statistics for the first of the proxied pair of transport layer connections comprise instructions executable by the processor to cause the apparatus to determine the set of one or more network statistics based, at least in part, on one or more statistics of a write buffer of the first of the proxied pair of transport layer connections.

17. The apparatus of claim 15, wherein the set of one or more network statistics further comprises at least one of packet loss of the first of the proxied pair of transport layer connections, round trip delay of the first of the proxied pair of transport layer connections, and a data transmit rate capacity of a data link supporting the first of the proxied pair of transport layer connections.

18. The apparatus of claim 15, wherein the instructions to monitor for a condition comprise instructions executable by the processor to cause the apparatus to monitor for a zero window condition.

19. The apparatus of claim 15, wherein the instructions to determine the transport layer window size comprise the instructions executable by the processor to cause the apparatus to determine a value greater than the bandwidth delay product within a predefined margin or to increase the bandwidth delay product by a defined factor.

\* \* \* \* \*